United States Patent Office.

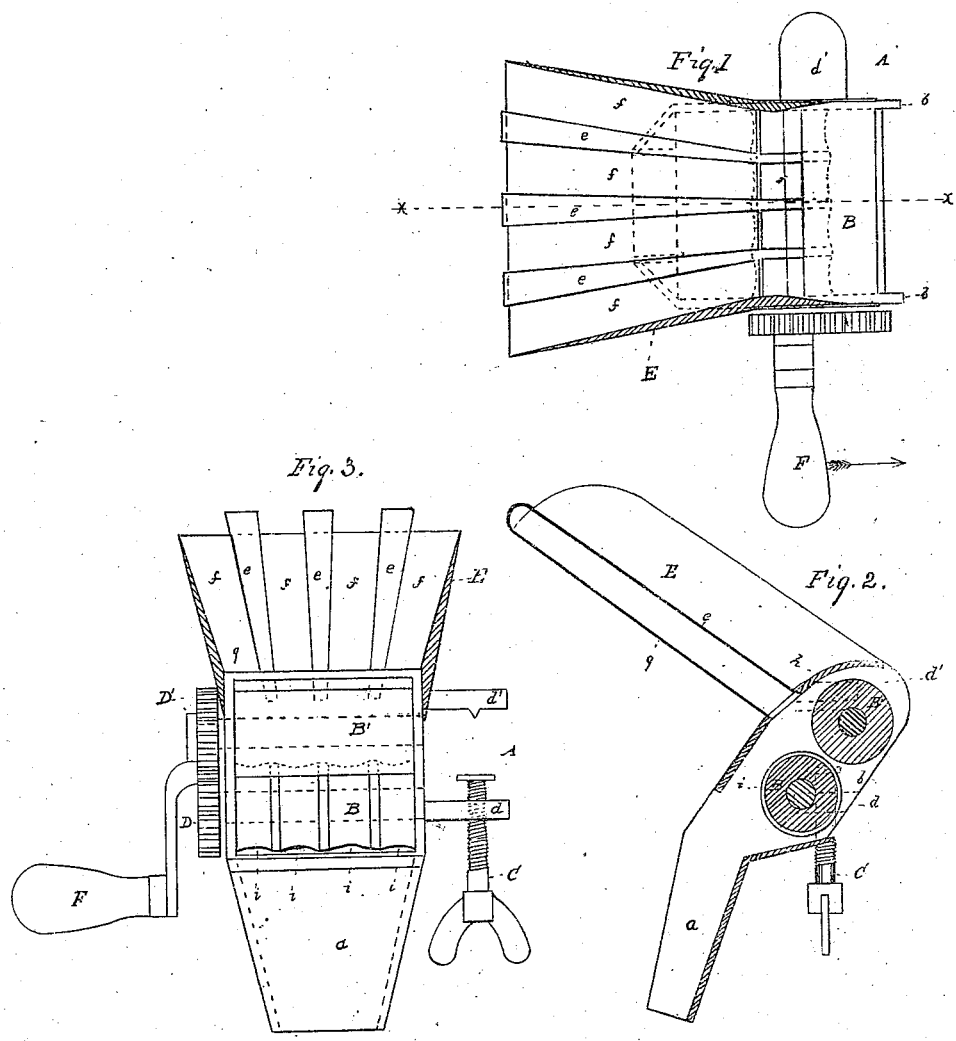

STEPHEN USTICK, OF PHILADELPHIA, PENNSYLVANIA.
*Assignor to George L. Miller of the same place.*

Letters Patent No. 77,683, dated May 5, 1868.

---

IMPROVED PEA-SHELLER.

---

*The Schedule referred to in these Letters Patent and making part of the same.*

---

TO ALL WHOM IT MAY CONCERN:

Be it known that I, STEPHEN USTICK, of the city and county of Philadelphia, and State of Pennsylvania, have invented a new and useful Improvement in Pea-Shellers; and I do hereby declare that the following is a full and exact description thereof, reference being had to the accompanying drawings, and to the letters of reference marked thereon.

The nature of my invention consists, in the first place, in the combination of longitudinal strips with the hopper of the pea-sheller, to form openings through which the pea-pods are conducted to the bottom of the hopper, upon which they fall parallel with each other, so as to cause them to enter beneath the shelling-rollers endwise. It consists, in the second place, in annular depressions in the lower roller, so arranged as to coincide with the openings between said strips, to facilitate the pods passing straight forward between the rollers, to prevent them crowding each other. In the accompanying drawings, which make a part of this specification—

Figure 1 is a plan of the sheller.
Figure 2 is a longitudinal section, at the line $x\,x$ of fig. 1.
Figure 3 is a front elevation.
Like letters in all the figures indicate the same parts.

A is a casting, which has a vertical chute, $a$, to separate the shelled peas from the pods as the latter pass between the rollers B and B', vertical jaws $b\,b$, which support the journals $c$ of the rollers, and ears $d\,d'$ for fastening the sheller to a table or bench, the lower ear $d$ being provided with a clamping-screw, C. The rollers B and B' are geared together by means of the spur-wheels D and D'. E is an inclined hopper, for feeding the unshelled peas to the rollers. There are strips $e$, of tin or other suitable material, so arranged as to form longitudinal openings $f$, through which the unshelled peas fall upon the bottom, $g$, of the hopper, parallel with each other, and at right angles to the shelling-rollers B and B', so as to enter between them endwise. These strips, I solder at their front ends to the front, $h$, of the hopper, and turn the rear ends down, and solder them to the under side of the bottom, $g$. The strips are elevated above the bottom more than the thickness of the unshelled pods, to allow the latter to advance to and between the rollers B and B', without being crowded by the pods above the strips. The connection may be made, however, in any convenient manner. And instead of strips, wire may be used, their ends being confined by soldering or inserting their rear ends in holes in the bottom, $g$, and their front ends in holes in the front, $h$, of the hopper. To facilitate the pods passing straight forward between the rollers B and B', so as not to crowd each other as they descend on the bottom, $g$, of the hopper, I form annular depressions $i$ in the lower roller B', as seen in figs. 2 and 3.

The operation is as follows: A handful of the unshelled pods is laid on the strips $e$, the lower ones of which fall through the spaces $f$, and rest on the bottom, $g$, of the hopper, parallel, or nearly so, with each other, their front ends entering between the rollers B and B', which draw the pods through as the handle F is turned in the direction of the arrow. The shelled pods pass out in front of the rollers, and the peas down the chute $a$, whence they fall in a receiving-vessel. The strips $e$ not only cause the peas to fall on the bottom, $g$, parallel with each other, but also relieve the bottom ones from the weight of the others, so as to cause them to slide forward freely as they are drawn by the rollers. They also prevent the shelled peas from flying up as they are forced out of the pods.

What I claim as my invention, and desire to secure by Letters Patent, is—

1. The combination and arrangement of the longitudinal strips $e$ with the hopper E, substantially in the manner above described, and for the purposes specified.

2. The combination of the roller B with the hopper E, when said roller has annular depressions $i$, which coincide with the spaces $f$, substantially as and for the purpose set forth.

In testimony that the above is my invention, I have hereunto set my hand and affixed my seal, this sixth day of April, 1868.

STEPHEN USTICK. [L. S.]

Witnesses:
JOHN WHITE,
J. M. STEELLING.